Nov. 15, 1966 J. LENG 3,286,253

ANALOG-TO-DIGITAL ENCODER

Filed March 10, 1964

Inventor
John Leng
By Stevens Davis Miller & Mosher
Attorneys

United States Patent Office 3,286,253
Patented Nov. 15, 1966

3,286,253
ANALOG-TO-DIGITAL ENCODER

John Leng, Ottawa, Ontario, Canada, assignor to Atomic Energy of Canada Limited, Ottawa, Ontario, Canada
Filed Mar. 10, 1964, Ser. No. 350,793
2 Claims. (Cl. 340—347)

This invention relates to improvements in analog-to-digital encoders for converting an analog input signal to a corresponding set of digital output signals.

More specifically, the present invention relates to analog-to-digital converters of the voltage-input feedback type in which a digital-to-analog converter is used in an information feedback arrangement. Such devices are known, the present invention being concerned with improvements therein, more particularly improvements in the speed and reliability of operation obtainable, and also in the linearity obtainable both differentially (between steps) and integrally (overall).

One example of an encoder constructed in accordance with the present invention is illustrated diagrammatically in the accompanying drawings. This embodiment of the invention is provided by way of example only, the broad scope of the invention being defined in the appended claims.

Figures 1, 2:
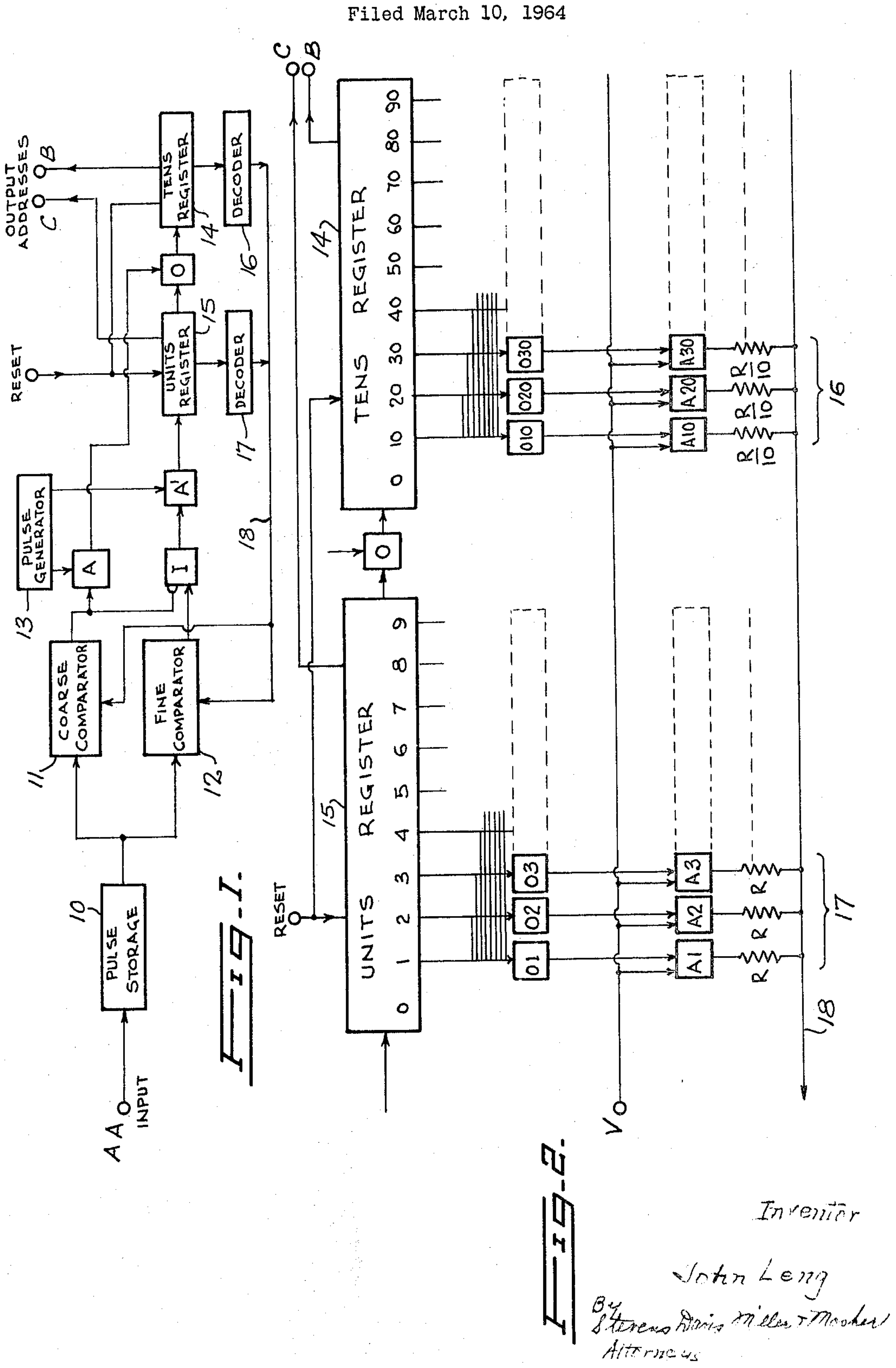
FIGURE 1 is a block diagram of the overall system.
FIGURE 2 is a diagram of the digital-to-analog portion of the system.

The input signal received at an input terminal AA (FIGURE 1) is stored in a conventional pulse storage circuit 10 and is presented to the inputs of coarse and fine comparators 11 and 12 respectively. The output of coarse comparator 11 actuates an AND gate A which also receives an input from a pulse generator (oscillator) 13 and has an output to an OR gate O, the output of which feeds to an upper lever (tens) digital register 14 which may be a conventional ring counter. In a like manner, the output of the fine comparator 12 passes through an INHIBIT gate I to a second AND gate A′, also supplied from the pulse generator 13, and the output of which goes to a lower level (units) digital register 15, also conveniently a ring counter. The registers 14 and 15 respectively control digital-to-analog decoders 16 and 17, the combined outputs of which are fed in line 18 as an analog feedback signal to both the comparators 11 and 12.

This decoding stage is illustrated diagrammatically in FIGURE 2. Each bistable element 1 to 9 of the units register 15 is connected to an OR gate O1, O2, O3, etc., each OR gate being also connected to each higher number bistable element. Similarly in the tens register 14 each bistable element 10 to 90 is connected to an OR gate O10, O20, O30, etc. The output of each OR gate actuates a gate A1, A2, A3, etc. and A10, A20, A30, etc. These gates are all supplied with a stable voltage V which appears at the output of each actuated gate, such output being connected through a resistance R (in the units register) or a resistance $R/10$ (in the tens register) to line 18.

Assuming the registers 14 and 15 to be initially set to 0, the appearance of a signal at the input terminal AA will cause both the comparators 11 and 12 to indicate a difference between their inputs. Accordingly, output signals will appear at both comparators. While the coarse comparator 11 is operating it actuates the INHIBIT gate I to render the fine comparator 12 ineffectual. The output signal from the coarse comparator 11 opens the AND gate A so that pulses from the generator 13 pass through the OR gate O to pulse the tens register 14. Each step which a pulse advances the register 14 represents ten units of digital output. Assuming, for example, that the analog input at terminal AA is equivalent to a digital output of 64, the tens register 14 will receive 6 pulses from the generator 13, equivalent to an output of 60 units, before its feedback effect on the coarse comparator 11 prevents further pulsing.

The 6 counts in the register 14 act to open OR gates O10–O60 and gates A10–A60 to apply the stable voltage V to the output of the line 18 through the resistance network of six resistances $R/10$ in parallel, which yields an analog feedback voltage proportional to 60 digital units. The coarse comparator 11 is set to produce an output only when the difference between its two inputs is not less than a value equivalent to ten digital units. The difference is now four units, so the comparator 11 no longer produces an output. However, the fine comparator 12 will detect this difference of four units between the input and feedback signals and will open the AND gate A′ through the now released INHIBIT gate I. In this way, further pulses from the pulse generator 13 are fed to the units register 15, until, in the present example, four such pulses have been counted. Now the digital-to-analog converter 17 will, in a like manner to the converter 16, generate a further voltage which is equivalent to the four digital units and which is added to the output of the converter 16 in line 18. The fine comparator 12 will now be in balance and both AND gates A and A′ will be closed. The analog-to-digital conversion is complete, and the digital value now stored in the registers 14 and 15 can be read out at the output addresses B and C. The registers 14 and 15 can be reset in a conventional manner.

The units register 15 has a carry output to the OR gate O, in case the coarse comparator 11 has failed to detect a difference between the feedback and input signals of ten units.

The fine comparator can be set to generate an output when the difference between the feedback and input signals is not less than a value equivalent to approximately one digital unit, but, if it is preferred to advance the register to the next count when any value from 0.5 to 0.99 remains as the signal difference, the fine comparator can be set to generate an output when the difference is not less than approximately half a digital unit.

The present construction differs from prior proposals in that it provides for a two stage comparison, coarse and fine. This enables the registers quickly to achieve equality with the input signal under comparison. In the example taken of the input signal being equivalent to 64 digital units, only a total of ten pulses from the generator 13 are required to bring the two registers to the condition required for balance, instead of the 64 pulses that would be required in a conventional single stage feedback circuit.

The following observations show the maximum errors possible both in respect of differential and integral linearity.

Assume that the resistors used in FIGURE 2 are of a standard each to have a maximum error of 0.1%. The maximum deviations from linearity as the counter progresses, count by count, is thus ±0.1%. This is thus the maximum deviation from differential linearity in either register. The integral linearity is also ±0.1%, since the error is being added in the same proportion as the total resistance which depends on the number of resistors in circuit at any one time. When the change comes from nine to ten, nine resistors in the units register are replaced by a single resistor in the tens register. At this point the differential linearity will be approximately ten times greater, i.e., ±1%. However, the integral linearity still remains at ±0.1%.

The present system has numerous other advantages.

Firstly, it shows increased encoding speed over single stage circuits. For a one megacycle per second clock rate from the generator 13, a hundred channels can be encoded in 20 μsec., rather than the 100 μsec. required using pulse-height-to-time techniques. The linearity, as above demonstrated, is good over the full scale. Pulse-height-to-time techniques have difficulty in providing linearity in the first 5% of their channels. The present circuit provides good differential and integral linearity over the full scale.

The circuit is versatile since it can easily be expanded. The system need not be decimal. For example, by using two ring counters of 16 bistable circuits as the upper and lower level (no longer tens and units) registers, a 256 channel encoder can be produced; with the same resistor arrangement the worst differential linearity is only ±1.6%.

Another advantage of the present circuit is that the pulse generator or oscillator need not be stable, as it must be in pulse-height-to-time techniques. The reason for this is that the generator is no longer the reference source, this function having been taken over by the fine comparator.

Finally, the present circuit avoids any difficulties that may arise through uncertainty as to whether a half pulse (received on switching in the pulse generator) is counted or missed. It makes no difference whether a pulse is missed, since it is the final position of the registers that provides the output, rather than the total number of pulses gated.

I claim:

1. An analog-to-digital encoder for converting an analog input signal to a corresponding set of digital output signals, comprising (a) a lower level digital register, (b) an upper level digital register, (c) decoding means coupled to said registers for generating an analog feedback signal corresponding to the digital information in said registers, (d) means for determining the difference between said analog feedback signal and said analog input signal, and means for generating a first output signal when said difference is not less than a first value equivalent to one step in said upper level register and for generating a second output signal when said difference is less than said first value but not less than a second value equivalent to approximately one step in said lower level register, (e) and means responsive to said first output signal for pulsing said upper level register and responsive to said second output signal for pulsing said lower level register.

2. An analog-to-digital encoder for converting an analog input signal to a corresponding set of digital output signals, comprising (a) a units digital register, (b) a tens digital register, (c) a decoding circuit coupled to said registers for generating an analog feedback signal corresponding to the digital information in said registers, (d) a coarse comparator and a fine comparator both connected to said decoding circuit to receive said analog feedback signal and both connected to receive said analog input signal, (e) said coarse comparator including means for generating an output signal when the difference between said analog feedback and analog input signals is not less than a value equivalent to ten digital units, (f) said fine comparator including means for generating an output signal when the difference between said analog feedback and analog input signals is not less than a value equivalent to approximately one digital unit, (g) a pulse generator, (h) first gate means connected to said coarse comparator for actuation by an output signal therefrom to connect said pulse generator to said tens register to pulse the same, (i) second gate means connected to said fine comparator for actuation by an output signal therefrom to connect said pulse generator to said units register to pulse the same, (j) and further gate means for inhibiting the pulsing of said units register during pulsing of said tens register.

References Cited by the Examiner

UNITED STATES PATENTS 2,775,754 12/1956 Sink ---------------- 340—347

MAYNARD R. WILBUR, *Primary Examiner.*

A. L. NEWMAN, *Assistant Examiner.*